United States Patent [19]

Nuttall

[11] 4,030,448
[45] June 21, 1977

[54] CAT LITTER DISPENSING CONTAINER
[76] Inventor: Judi Nuttall, 1722 Union Blvd., Allentown, Pa. 18103
[22] Filed: Apr. 13, 1976
[21] Appl. No.: 676,430
[52] U.S. Cl. .............................................. 119/1
[51] Int. Cl.² .................................... A01K 23/00
[58] Field of Search ..................................... 119/1
[56] References Cited
UNITED STATES PATENTS

| | | | |
|---|---|---|---|
| 3,482,546 | 12/1969 | Anderson | 119/1 |
| 3,735,735 | 5/1973 | Noroian | 119/1 |
| 3,831,557 | 8/1974 | Elesh | 119/1 |

Primary Examiner—Hugh R. Chamblee
Attorney, Agent, or Firm—Benasutti Associates, Ltd.

[57] ABSTRACT

A container is provided suitable for use by a cat in eliminating its wastes. The open top of the container can be closed off by a separate closure member at such time as it becomes desirable to empty the container. A separate opening is provided which is normally closed. The closure member of this opening can be removed and a bag placed about the portion of the container forming the opening to receive the material which can be shaken therethrough from the container.

4 Claims, 5 Drawing Figures

CAT LITTER DISPENSING CONTAINER

BACKGROUND OF THE INVENTION

This invention relates to a container for the waste material from trained house pets, and more particularly, to a container for cats for use in their waste elimination, which provides a new and novel means of dispensing the used cat litter and waste material.

In the prior art it is known to provide containers for use by cats in eliminating their wastes. Such containers are normally open at the top, and are relatively low. A material known as "kitty litter" is placed in the bottom of the container. When the cat uses the container for waste elimination, it normally will sweep a portion of the kitty litter over the new waste material with its paws.

While the kitty litter material contains substances to neutralize the odor of the waste material, the kitty litter must nevertheless be changed from time to time. In devices used in the prior art, the container is normally in the form of an open tray, and thus the changing of the kitty litter is, to a certain extent, a distasteful and unhygienic procedure.

SUMMARY OF THE INVENTION

I have overcome the failings of the prior art devices by providing a container which has a new and novel means for dispensing the used kitty litter. In accordance with the preferred embodiment of my invention, a container is provided which is open at the top and has an inwardly curved margin extending partially across the top to aid in containing the kitty litter as it is being swept by the cat's paws as described above. This margin may be covered, along with the remainder of the top opening, by a separate cover member normally retained in an envelope formed in the bottom of the container. In the closed condition, a cover is removed from a narrow neck extension of the container which forms a conduit opening into the inner chamber of the container. A plastic bag can be placed about this narrow neck portion and the container can be grasped by a handle disposed on the opposite side from the narrow neck portion, whereby the container may be inverted to dispense the soiled kitty litter through the conduit and into the bag. The bag can then be tied off in any convenient manner and the container can be cleaned and refilled.

Accordingly, it is an object of this invention to provide a container of the type described above, and this and other objects of the invention will become apparent from the following description with reference to the accompanying drawings.

DESCRIPTION OF THE PREFERRED EMBODIMENT

Figure 1:
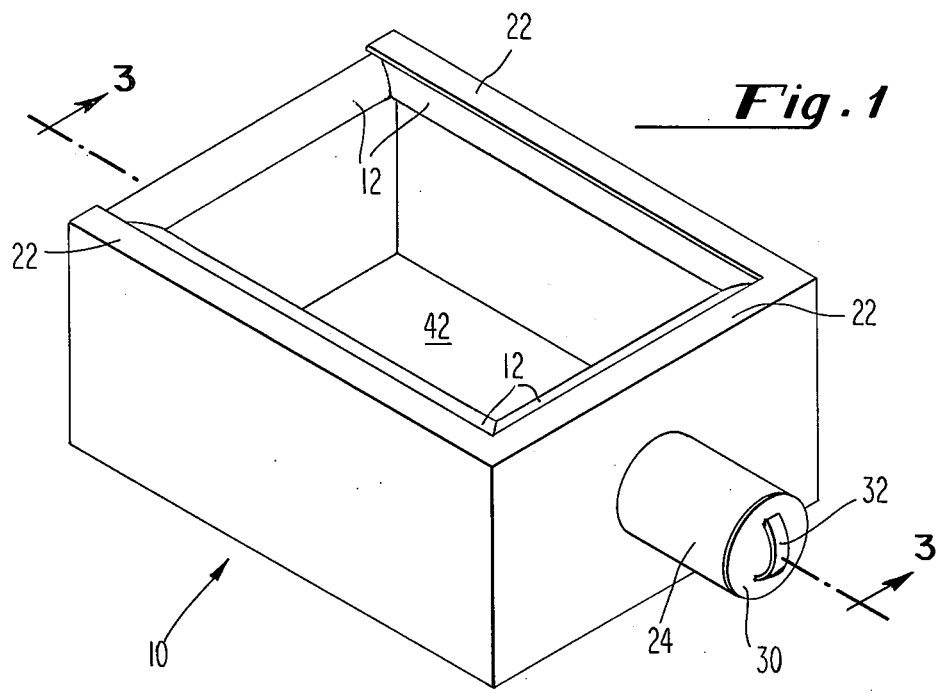
FIG. 1 is a perspective view of a container in accordance with the preferred embodiment of my invention.
Figure 2:
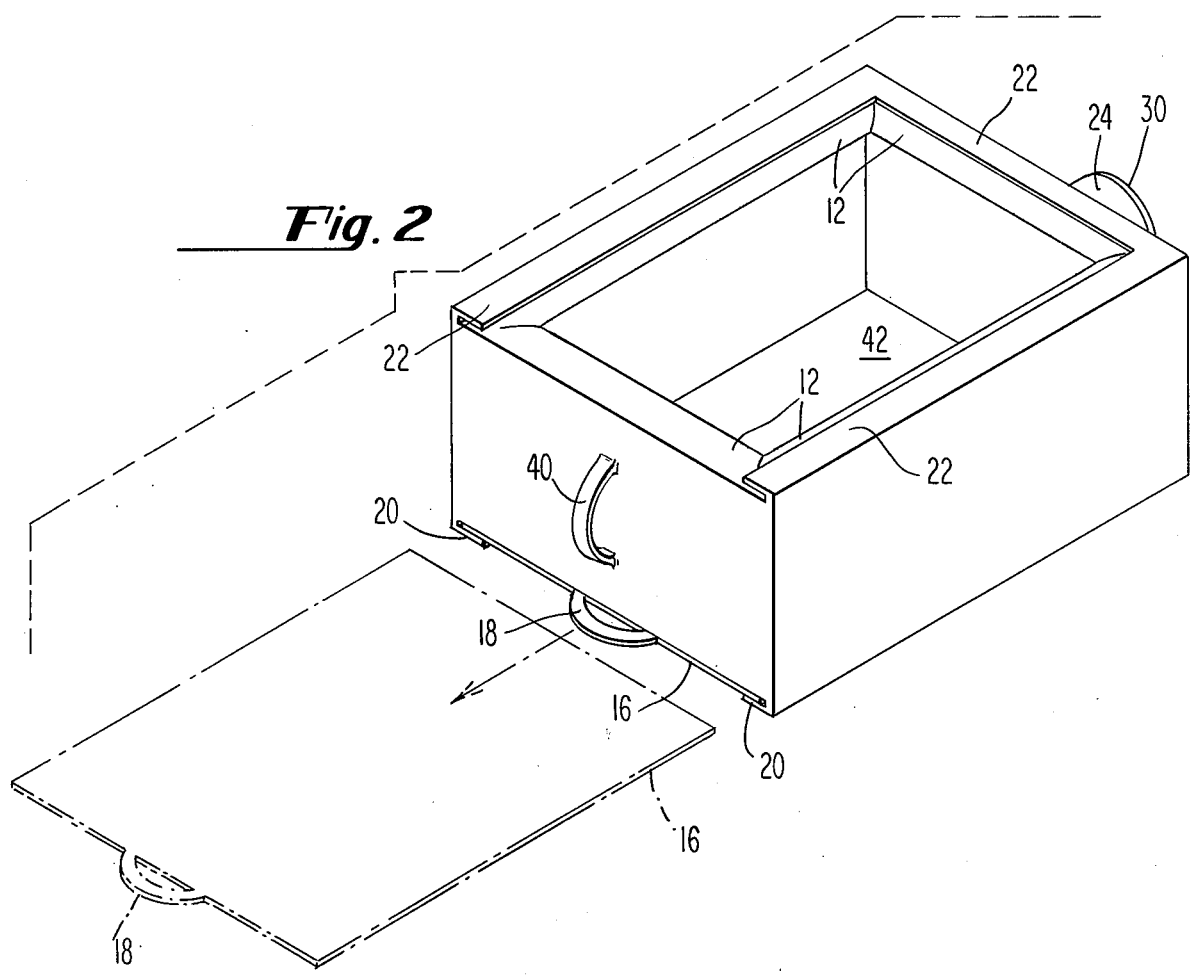
FIG. 2 is an exploded perspective view taken from the opposite side to FIG. 1 and showing an alternate position of one of the parts of the container in phantom lines.

Although specific forms of the invention have been selected for illustration in the drawings, and the following description is drawn in specific terms for the purpose of describing these forms of the invention, this description is not intended to limit the scope of the invention which is defined in the appended claims.

Figure 3:
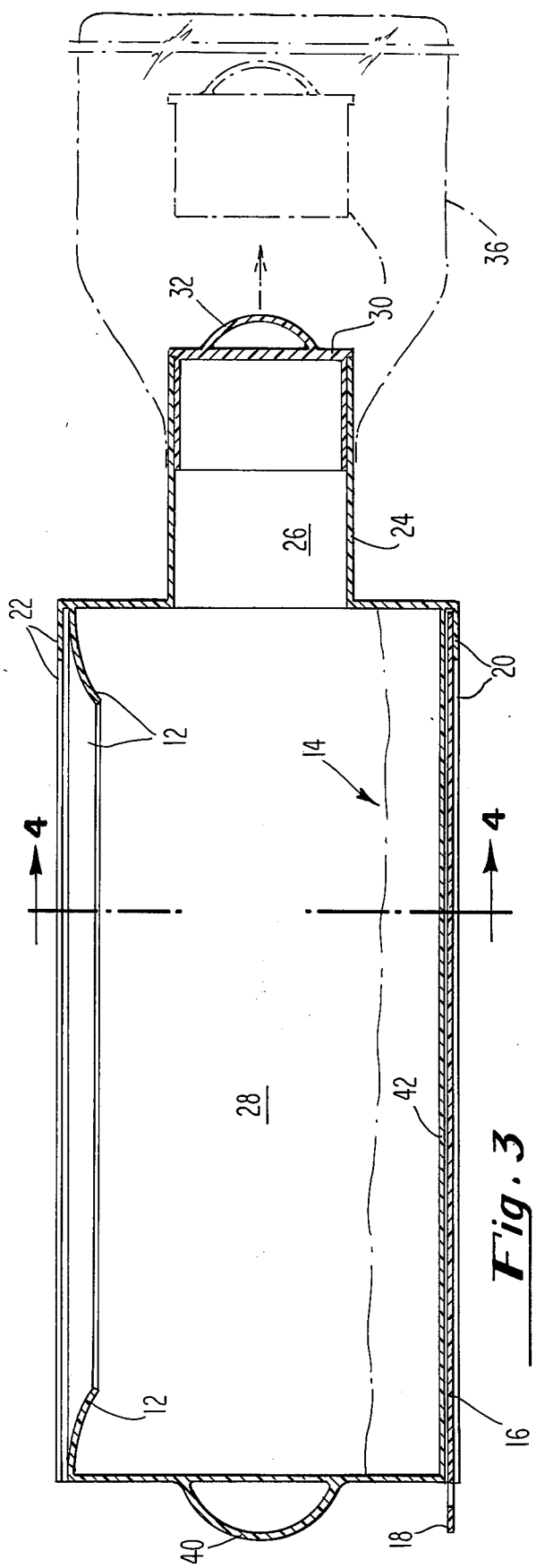
FIG. 3 is an enlarged section of the container taken as indicated by the lines and arrows 3—3 in FIG. 2 with alternate positions and materials shown in phantom lines.
Figure 5:
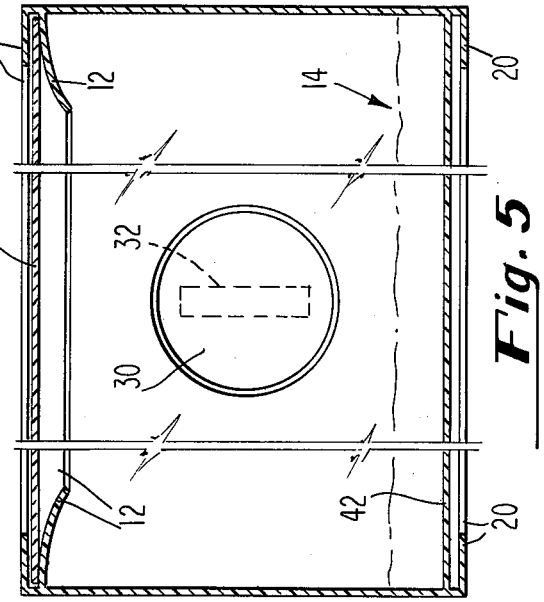
FIG. 5 is a section similar to FIG. 4 with a portion of the device removed from the position shown in FIG. 2 and placed in an alternate position.
Figure 4:
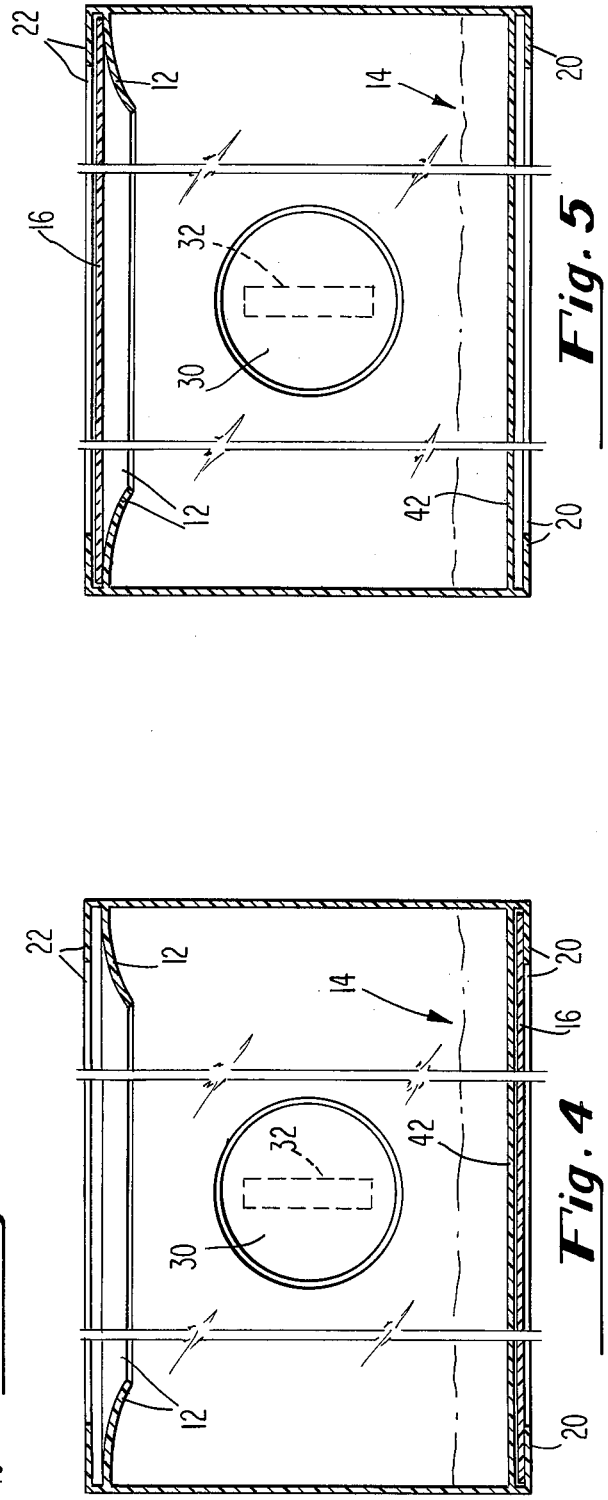
FIG. 4 is a section taken as indicated by the lines and arrows 4—4 in FIG. 3 which has been foreshortened for the sake of clarity.

Referring to the figures, the container shown is a box-like structure designated generally 10, having a width of, for example, fourteen inches and a length of, for example, nineteen inches. The container is open at the top as shown and has an upper margin 12 which extends inwardly from the side walls of the container and is curved slightly downwardly as best shown in the sectional views 4 and 5. The margin can extend in a distance of approximately 1½ inches. The downward curve of this margin produces a beneficial effect when used by the cat. As shown in FIGS. 3, 4 and 5, kitty litter designated generally 14 is normally disposed in the bottom of the container. As this litter is being swept by the hind paws of the cat, it tends to be kicked up and out of the box even if the lip or margin 12 extends inwardly, but not downwardly. The downward curve tends to redirect the ricocheting material back into the box.

In order to close off the upper opening of the container, I provide a closure member in the form of a flat plate 16 having a handle 18, which is retained normally in an envelope formed in the bottom of the container by the inwardly depending flanges 20. The retaining means for this plate in the closed position comprise the inwardly depending flanges 22 extending above the margins 12. Thus, the closure member can be moved from the position shown in FIG. 4 in the bottom envelope to the position shown in FIG. 5 in the upper envelope, wherein it provides a relatively sealed chamber within the container.

At one end of the container I provide an elongated extension or narrow neck portion 24, which in the embodiment shown is generally cylindrical and forms a conduit 26 communicating with the chamber 28. The outer end of this conduit is closed by a cup-shaped cap or closure member 30 having a handle 32 which allows the cap to be withdrawn or removed from the outer opening of the conduit most remote from the chamber 28. It will be appreciated that any one of a number of means can be used to engage the cap 30 with the member 24, such as a sliding or partially interference fit, in order to prevent the cap from being inadvertently removed thereby allowing the kitty litter to be spewed out through the conduit. To this end, I have made the cap elongated in the preferred embodiment so that a large cylindrical area of the cap extends into the conduit 26 and is in engagement with the inner wall of the member 24 to provide a frictional resistance to removal of the cap by inadvertent means, as for example, the propelled kitty litter resulting from the action of the cat's paws, as previously described.

When this cap is removed from the position shown in full lines in FIG. 3 to the position shown in phantom lines, it can be temporarily set aside, and then a bag, shown in phantom lines in FIG. 3, can be positioned about the extension 24, as clearly illustrated. For the sake of convenience, the bag may be made of plastic and can be simply gripped against the extension. While so holding the bag with one hand against the outer surface of extension 24, one can grip the handle 40 and invert the container so that the extension 24 faces vertically downwardly, and the handle is positioned above it. One can then shake the container so that the kitty litter is expelled or dispensed through the conduit 26 and into the bag 36. Thus, the chamber 28 can be emptied of used kitty litter in a hygienic and convenient manner. The bag can then be slid off the extension 24 and closed. It can be tied off in any convenient manner, such as by a small paper covered wire being placed about it and having the ends thereof twisted together. Thus, this method of dispensing with the means provided by my invention is both hygienic and less obnoxious than the prior art methods of cleaning kitty litter boxes.

The box itself may be made of lightweight aluminum, plastic, or any other suitable material which is preferably washable. In addition, the outside-bottom surface of the flange 20 can be treated so as to provide a non-skid surface, to insure non-movability of the container. All edges of the box should be beveled or buffed so that there are no rough edges upon which the cat can injure itself. The bottom of the box may be reinforced by cross bars if desired. Further, the box may be cleaned after it is emptied with the aid of a scraper if so desired.

The box as disclosed is essentially spillproof and largely odor-free and easy to clean, and as noted requires only two movable parts.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office and is not intended to limit the scope of the invention described and claimed herein.

What is claimed is:

1. A container for cat waste dispensing, comprising:
   a. means forming a chamber for containing the cat waste, said means having a plurality of openings communicating with said chamber;
   b. closure means for each of said openings;
   c. means for engaging said closure means and retaining them with respect to each of said openings to seal off said chamber, said closure means being readily removable to open said chamber and provide access thereto; and
   d. said container having an extension forming a narrow neck portion providing a conduit communicating with said chamber, one end of said extension providing one of said openings.

2. The invention of claim 1 wherein manual gripping means is provided extending from the wall of said container opposite to said narrow neck extension.

3. The invention of claim 2 wherein manual gripping means are provided on each of said closure members for removing each closure member from its respective retained position.

4. A method of collecting and dispensing waste material which is the product of a household pet, comprising the steps of:
   a. providing a container having a plurality of openings therein, at least one of which is sufficient to allow the pet to deposit its wastes within said container;
   b. closing off said opening once said material has been deposited within said container;
   c. opening another of said openings;
   d. placing a flexible bag about said opening;
   e. moving said container so as to dispense the material therein through said opening and into said bag; and
   f. sealing said bag and said opening.

* * * * *